(12) United States Patent
Walton et al.

(10) Patent No.: US 9,935,709 B2
(45) Date of Patent: Apr. 3, 2018

(54) HEADER AND PAYLOAD SIGNALS WITH DIFFERENT OPTICAL PROPERTIES

(71) Applicant: Hewlett Packard Enterprise Development LP, Houston, TX (US)

(72) Inventors: Andrew C. Walton, Rocklin, CA (US); Hang Maxime Ung, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/189,525

(22) Filed: Jun. 22, 2016

(65) Prior Publication Data

US 2017/0373755 A1 Dec. 28, 2017

(51) Int. Cl.
*H04B 10/00* (2013.01)
*H04B 10/114* (2013.01)
*H04L 29/06* (2006.01)

(52) U.S. Cl.
CPC .......... *H04B 10/1143* (2013.01); *H04L 69/22* (2013.01)

(58) Field of Classification Search
CPC ....... H04Q 11/0066; H04Q 2011/0088; H04Q 2011/0041; H04J 14/0227; H04L 69/16
USPC ........................................................ 398/118
See application file for complete search history.

(56) References Cited

U.S. PATENT DOCUMENTS

| 8,971,715 | B2 | 3/2015 | Zhang et al. | |
| 9,251,496 | B2 | 2/2016 | Brown | |
| 2003/0117678 | A1* | 6/2003 | Chang | H04Q 11/0062 398/49 |
| 2004/0136385 | A1* | 7/2004 | Xue | H04L 45/00 370/401 |
| 2009/0060506 | A1* | 3/2009 | Matsunaga | H04Q 11/0005 398/53 |
| 2009/0110405 | A1 | 4/2009 | Lee et al. | |

FOREIGN PATENT DOCUMENTS

WO WO-2008068544 6/2008

OTHER PUBLICATIONS

C. Danakis, M. Afgani, G. Povey, I. Underwood and H. Haas, "Using a CMOS camera sensor for visible light communication," in 2012 IEEE Globecom Workshops (GC Wkshps), 2012, pp. 1244-1248.

Y.-S. Kuo, P. Pannuto, K.-J. Hsiao, and P. Dutta, "Luxapose: Indoor positioning with mobile phones and visible light," in Proceedings of the 20th annual international conference on Mobile computing and networking, 2014, pp. 447-458.

Yuan, W, et al.; "Phase Messaging Method for Time-of-flight Cameras"; 2014; 8 pages.

* cited by examiner

*Primary Examiner* — Don N Vo
(74) *Attorney, Agent, or Firm* — Michael A. Dryja

(57) ABSTRACT

A method, a system, and a non-transitory computer-readable memory resource containing instructions for transmitting data are provided. In an example, the method includes providing a header signal having a first optical property. The header signal indicates a start of a packet, and has a minimum period between transitions that is less than a frame period of a receiving device and greater than a scanline period of the receiving device. A payload signal of the packet is provided that has a second optical property that is different from the first optical property. The payload signal has a minimum period between transitions that is less than the frame period of the receiving device and greater than the scanline period of the receiving device.

20 Claims, 7 Drawing Sheets

HEADER AND PAYLOAD SIGNALS WITH DIFFERENT OPTICAL PROPERTIES

BACKGROUND

The mobile phone has become a nearly ubiquitous personal computing device. Because it is quick to activate, universal, and frequently at hand, the mobile phone provides a convenient interface for an increasing number of stand-alone and/or embedded electronics in applications including system administration, home/office automation, environmental control, and others. For these purposes and others, a number of techniques have been developed to communicate between a computing system and a mobile phone or other mobile device. In addition to radio-band communications such as WiFi and BLUETOOTH® (a trademark of Bluetooth Special Interest Group), visible and near-visible light may be used to exchange data with a mobile device.

BRIEF DESCRIPTION OF THE DRAWINGS

Certain examples are described in the following detailed description with reference to the drawings, of which.

DETAILED DESCRIPTION OF SPECIFIC EXAMPLES

Figure 1:
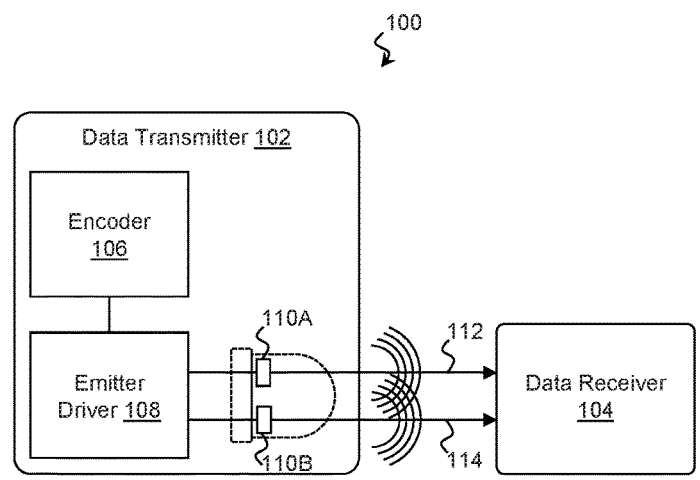
FIG. 1 is a block diagram of a data communication environment according to some examples of the present disclosure.

Visible and near-visible light may be used to transmit data to a mobile device such as a smartphone, digital camera, personal digital assistant (PDA), or handheld scanner. In addition to static images such as a 1D or 2D barcode, data may be encoded in dynamic signals. For example, the rapid cycle times of Light Emitting Diodes (LEDs) and other light sources may be used to encode data by varying the amplitude and/or frequency of the light emitted. These variations may be measured by a sensor on the mobile device, such as an image sensor found in a mobile phone or camera, and decoded to decipher the data contained therein.

Rather than capture an entire scene at once, many image sensors, including many Complementary Metal Oxide Semiconductor (CMOS) image sensors, capture an image one line (either horizontal or vertical) at a time. This behavior may be referred to as a rolling shutter, and when photographing fast-moving subjects, the rolling shutter may result in a number of visual effects. However, this behavior may also be used to increase data transmission rates. Instead of sampling a data signal at the frame rate of the image sensor, data may be sampled at the scanline rate by treating each scanline within the sensor as a separate sample. Because the scanlines are recorded at a slightly different time, each line represents a distinct time slice of the data-bearing light. Whereas some image sensors may only capture 30 frames per second, an 8-megapixel image sensor may have approximately 2450 scanlines per frame. Even using a more modest 1080 scanlines at 30 frames per second gives 32400 samples per second.

The increase in sampling rate allows for an increase in the data rate. In addition to transmitting data faster, a faster data rate may reduce visual disturbances caused by the data signal. When using visible light to transmit data, slower transitions in the light source associated with slower data rates may be perceived as flicker. Conversely, faster transitions may reduce or eliminate perceived flicker. Thus, in some examples, the technique of the present disclosure provides a flicker-free method of transmitting data via visible light.

In order to avoid constructing packets from multiple image frames, the packet size may be limited to some fraction of the image frame so that each frame includes at least one whole packet. To address this limitation, some examples of the present disclosure provide a packet with a larger payload ratio that can contain more data. In some such examples, this is done through an improved packet header. In more detail, a transmission may be packetized, with each packet including a payload that contains the data being transmitted and a header to indicate the start of the packet. While the header may be identified by a unique bit sequence or token, the identifying sequence or token may decrease the amount of the packet available for the payload and may take considerable processing power to locate. To address this issue and others, some examples of the present disclosure utilize a header that is identifiable by some optical property other than a sequence of high and low states. For example, the header may be transmitted using a different frequency (i.e., color) of light than the payload of the data packet. By omitting the identifying sequence, the header may be shorter, which may leave more time for the payload. In some examples, the header and the payload may be transmitted concurrently because of their different optical properties, thus allowing even more time for the payload.

It has been determined that a flash of differently colored light used to transmit the header may be visually jarring. Accordingly, in some such examples, the header is brief enough that it is not visually perceptible to a user. In this way, light used to transmit the payload may mask the light used to transmit the header in the relatively brief interval that the latter is active. Additionally or in the alternative, the light used to transmit the header may be dimmer than the light used to transmit the payload. Accordingly, the user may perceive the light used to transmit the payload of the packet as a consistent light source despite the variations in intensity used to encode the data and despite the occasional use of another light source.

By these mechanisms and others, the present disclosure provides a novel technique for light-based communication with substantial real world improvements that resolves several issues pertaining to data rate and visual disturbances. For instance, by sampling using scanlines, transmission frequency may be increased to reduce or eliminate perceptible flicker. As another example, the header may be distinguished from the payload by a different optical property, which may reduce the header length and increase the payload size. To prevent the header signal from presenting a distraction, it may be short enough in duration to be imperceptible and may be masked by the payload signal.

These and other examples are described with reference to the following figures. Unless noted otherwise, these figures and their accompanying description are non-limiting and no element is characteristic of any particular example. In that regard, features from one example may be freely incorporated into other examples without departing from the spirit and scope of the disclosure.

FIG. 1 is a block diagram of a data communication environment 100 according to some examples of the present disclosure. The data communication environment 100 includes a data transmitter 102 in communication with a data receiver 104. While only a single data transmitter 102 and data receiver 104 are illustrated, the environment 100 may include any number of data transmitters 102 and receivers 104 in communication, and for bidirectional communication, a single device may include both a data transmitter 102 and a data receiver 104.

With respect to the data transmitter 102, the transmitter 102 may include an encoder 106 communicatively coupled to an emitter driver 108. The encoder 106 is operable to receive data and prepare the data for transmission using any suitable protocol. In some examples, the encoder 106 is operable to divide the data into packets, an example of which is shown in FIG. 2.

Figure 2:
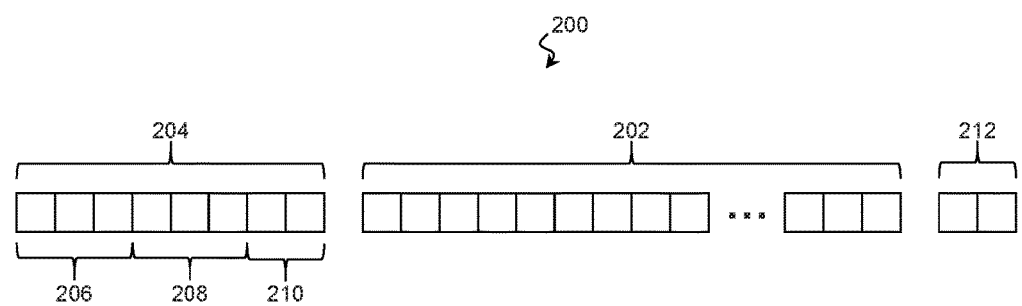
FIG. 2 is a diagram of a data packet for transmission according to some examples of the present disclosure.

FIG. 2 is a diagram of a data packet 200 for transmission according to some examples of the present disclosure. An example of the packet 200 includes a payload 202 that contains the data to be transmitted and a header 204 that signifies the start of the packet. The header 204 may include various fields such as a packet number field 206, a total field 208 that records the total number of packets in a message, an end of message field 210, etc. In some examples, the packet 200 includes a termination sequence 212 that indicates the end of the packet.

Once the data has been packetized, the encoder 106 may translate the packet 200 into a form for transmission using any suitable modulation including on-off keying, Manchester encoding, return-to-zero, non-return-to-zero, Miller encoding, etc. The encoded values representing the packet 200 are provided to an emitter driver 108. The values for the header 204 and the payload 202 may be provided on separate channels.

The emitter driver 108 causes one or more optical emitter elements (e.g., elements 110A and 110B) to produce a visible or near-visible (e.g., ultraviolet, infrared, etc.) electromagnetic signal that transmits the encoded values to the receiver 104. Binary values of the encoded packet are represented as high and low intensity light from the emitter elements. Instead of transmitting the entire packet using the same modality, the emitter driver 108 may transmit the header 204 of the packet 200 in a header signal 112 that has a different optical property than a payload signal 114 of the packet 200. For example, the header signal 112 may be transmitted using red light, and the payload signal 114 may be transmitted using green light. There may be some overlap in the wavelengths of light used to transmit the header signal 112 and the payload signal 114. In another example, the header signal 112 and payload signal 114 are transmitted using different polarities of light.

To transmit the signals with different optical properties, the emitter driver 108 may transmit the header signal 112 via a first optical emitter element 110A and transmit the payload signal 114 via a second optical emitter element 110B. The first optical emitter element 110A and second optical emitter element 110B produce light with at least one different property and may be any suitable type of emitter that is operable to cycle states rapidly, such as a Light Emitting Diode (LED). In the illustrated example, the first optical emitter element 110A and the second optical emitter element 110B are different LED emitters contained in the same housing, although they may also be separate discrete emitters.

Additionally or in the alternative, a single optical emitter element that is operable to transmit multiple signals with different properties is used, and in some examples, the header signal 112 and the payload signal 114 are transmitted by the same optical emitter element. In addition to transmitting the respective signals, the emitter element(s) may be used for other lighting purposes. In some examples, the optical emitter elements 110A and 110B are used to illuminate a logo, a display, and/or an advertisement. In some examples, the optical emitter elements 110A and 110B are used as a status indicator such as a power indicator and/or an activity indicator. In some examples, the optical emitter elements 110A and 110B are used for ambient illumination.

While the header signal 112 and the payload signal 114 may have any suitable form and properties, in some examples, aspects of the signals are determined based on aspects of the data receiver 104. In some such examples, the data receiver 104 captures a frame of signal data using a rolling shutter that assembles the frame one scanline at a time. In such examples, the minimum time period between transitions of the header signal 112 and the payload signal 114 are each less than a frame period of the receiver 104 and greater than a scanline period of the receiver 104. This is described in more detail with reference to FIG. 3.

Figure 3:
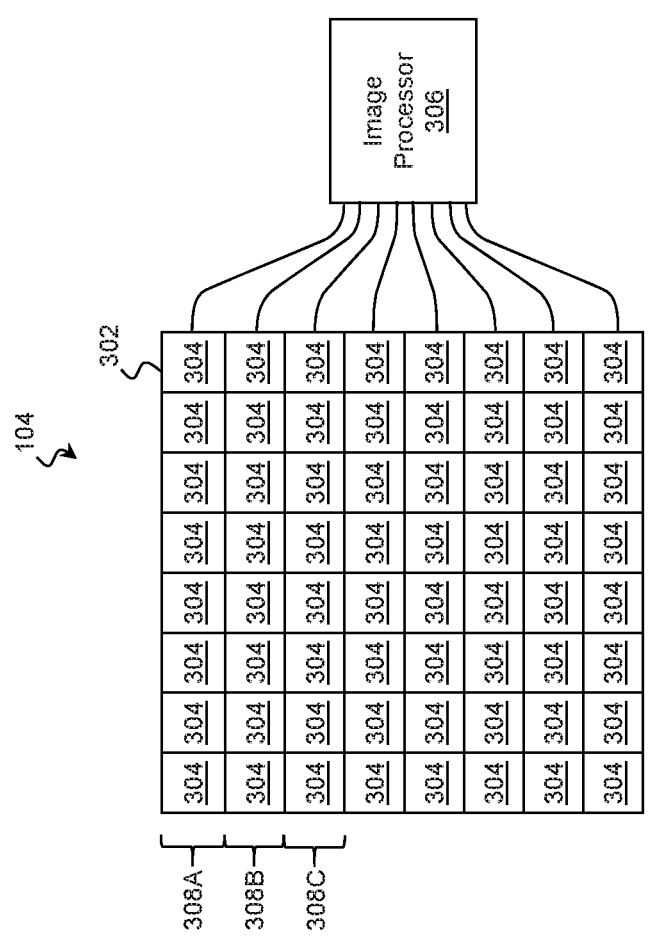
FIG. 3 is a block diagram of a data receiver according to some examples of the present disclosure.

FIG. 3 is a block diagram of a data receiver 104 according to some examples of the present disclosure. In the illustrated examples, the data receiver 104 includes an image sensor 302 operable to detect the header signal 112 and the payload signal 114. The image sensor 302 is structured as an array of pixels 304. Each pixel 304 includes one or more light sensitive devices, such as a Complementary Metal Oxide Semiconductor (CMOS) or Charge Coupled Device (CCD) sensor, that produces an electrical signal in response to light. Optics steer light towards the pixels 304 so that each pixel 304 receives light from a specific region of a scene. An image processor 306 samples the response of the pixels 304 and may perform various image enhancements to construct a frame of an image.

Rather than capture the responses of all the pixels 304 at the same time (using a global shutter), many image processors 306 sample the pixels 304 one or more rows (horizontal or vertical) at a time to form a set of scanlines. For example, row 308A may be sampled first. Row 308B may be sampled next, and row 308C may be sampled thereafter. Once each row has been sampled, the image processor 306 may construct the image frame from the scanlines.

In some examples, the framerate of the data receiver 104 is low enough that transmitting at one bit per frame would be perceived as having visible flicker. However, provided the header signal 112 and the payload signal 114 from the transmitter's optical emitter element(s) are visible to more than one row of the image sensor 302, each row may be used as a discrete sampling of the signal(s). In the example, the response of the pixels in row 308A may indicate the intensity of a signal at time $T_1$. The response of pixels in row 308B may indicate the intensity of the signal at time $T_2$, and the response of pixels in row 308C may indicate the intensity of the signal at time $T_3$. These scanline samples may be used to reconstruct the packet. Using the scanlines to sample the signal allows transmission at higher rates without visible flicker.

To accurately sample a signal, at least one sample is taken for each state of the signal. If two transitions occur without a sample taken between the two, data may be lost. Thus, the minimum time period between transitions of the header signal 112 and the payload signal 114 may be greater than the scanline period but less than the frame period of the data receiver 104. For on-off keyed signals where each bit is represented by one state, the minimum period between transitions may be the bit period. For Manchester-encoded signals where each bit is represented by two states, the minimum period between transitions may be the half the bit period. In an example, a Manchester-encoded header signal 112 and a similarly encoded payload signal 114 have a minimum period between transitions between about 200 µs and about 20 µs. In contrast, a frame period of an image sensor 302 in the example may be on the order of 10 ms with a scanline period of about 10 µs.

Once the samples of the signal(s) have been obtained, the image processor 306 may perform various image enhancements in order to convert the scanline signals into binary values and to recover the data from the binary values. For example, the image processor 306 may normalize the intensity across the scanlines. For a number of reasons including the directionality of the pixels 304, the high and low intensity light of the signals may produce different responses in different scanlines. Normalization may help account for this effect. The image processor 306 may also apply a threshold to distinguish between high and low intensity light and to infer binary values therefrom.

With the sensor data converted to a raw stream of binary values, the image processor 306 may identify packet boundaries in the stream using the header. In particular, the header values may be easy to distinguish from the remainder of the transmission because of the different optical property. In an example, the header values are the only part of the transmission transmitted using red light. Once the header is located, it may be used to recognize the corresponding payload in the stream of binary values and to re-packetize the payload data.

Because the header signal 112 and the payload signal 114 are transmitted with distinct optical properties, they may overlap and still be distinguishable by the data receiver 104. In other words, the emitter driver 108 may cause the header signal 112 and the payload signal 114 to be transmitted concurrently. In one such example, the header signal 112 and the payload signal 114 for a packet are started at the same time, although the header signal 112 may finish before the payload signal 114. This may increase the time available for transmitting the payload and thereby increase the amount of data per packet. In such examples, the image processor 306 recognizes the start of the payload data for a packet to be at or near the start of the header data for the packet. In other examples, the payload signal 114 immediately follows the header signal 112, and the image processor 306 recognizes the start of the payload data for a packet to be at or near the end of the header data for the packet.

From the packetized binary values, the image processor 306 may reverse the encoding applied by the encoder 106 in order to decode the packet and extract the data from the payload. In this way, examples of the present technique provide a technique for transmitting data using visible and near visible electro-magnetic radiation with improved packet recognition and reduced flicker.

Figure 4:
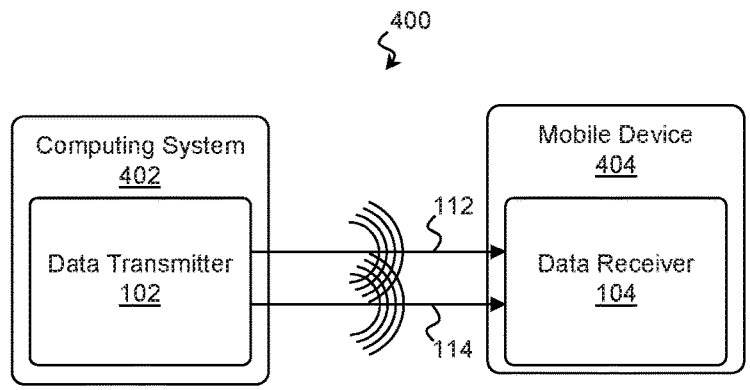
FIG. 4 is a block diagram of a computing environment according to some examples of the present disclosure.

The data transmitter 102 and the data receiver 104 may be incorporated into a variety of devices and are suitable for use in a wide range of applications. Some examples are described in the context of FIG. 4. In that regard, FIG. 4 is a block diagram of a computing environment 400 according to some examples of the present disclosure. The computing environment includes a computing system 402 (e.g., a server, desktop, laptop, or other computing device) and a mobile device 404. While the computing system 402 and the mobile device 404 are represented as single entities, each may include any number of computing devices operating together in order to perform a common function. For example, the computing system may include a single unitary computing device, a cluster of discrete computing devices, or any permutation thereof.

A data transmitter 102 substantially similar to that described in the context of FIG. 1 is incorporated into the computing system 402, and a data receiver 104 substantially similar to that described in the context of FIGS. 1 and 3 is incorporated into the mobile device 404. A technician may use the mobile device 404 to retrieve data from the computing system for various purposes, such as configuration, maintenance, and/or troubleshooting, by aiming the image sensor 302 at the data transmitter 102. When aligned, the mobile device 404 may receive a device identifier, an access code, a Uniform Resource Locator (URL), configuration information, and/or other suitable information. Additionally or in the alternative, the data transmitter 102 may transmit trouble codes, part identifiers for failing components, part identifiers for operating components, and/or status for various components of the associated computing system.

In some examples, the information allows the mobile device 404 to access a web-based control interface hosted on the computing system 402 or elsewhere. Some of this information, such as the device identifier, may be forwarded to the control interface via the mobile device 404. This may eliminate data entry errors. It may also avoid confusion in a crowded server room because the technician can unambiguously identify the computing system 402 by aiming the mobile device 404 at it. In some examples, the range of the data transmitter 102 is reduced to add a layer of security to the control interface by verifying that the technician is physically present.

In further examples, the data transmitter 102 is associated with a wireless network and may be incorporated into a wireless access point on the network. The data transmitter 102 transmits data to assist other devices in joining the network. Suitable data includes a network ID, channel information, a network access password, network configuration information, and/or other network information. In turn, the data receiver 104 may be incorporated into any computing device seeking to access the network. When the image sensor 302 of the data receiver 104 is aimed at the data transmitter 102, the receiver 104 receives the transmitted data, which may be used to help the receiving device or any other device to access the network. This may greatly simplify the network configuration process and may limit access to the network to users with physical access to the environment the network is in.

In yet further examples, the data transmitter 102 is associated with a lock, such as a lock on a door or computer enclosure. The data transmitter 102 may transmit a first part of a security key to the receiver 104. The first part of the key indicates that the receiver 104 is in proximity to the transmitter 102 and may prevent off-site attacks. A device associated with the receiver 104 may perform additional security verification using a password, biometric ID, and/or other verification measures to generate a second part of a security key. Both keys may then be sent to a third-party for verification in order to unlock the lock.

Figure 5:
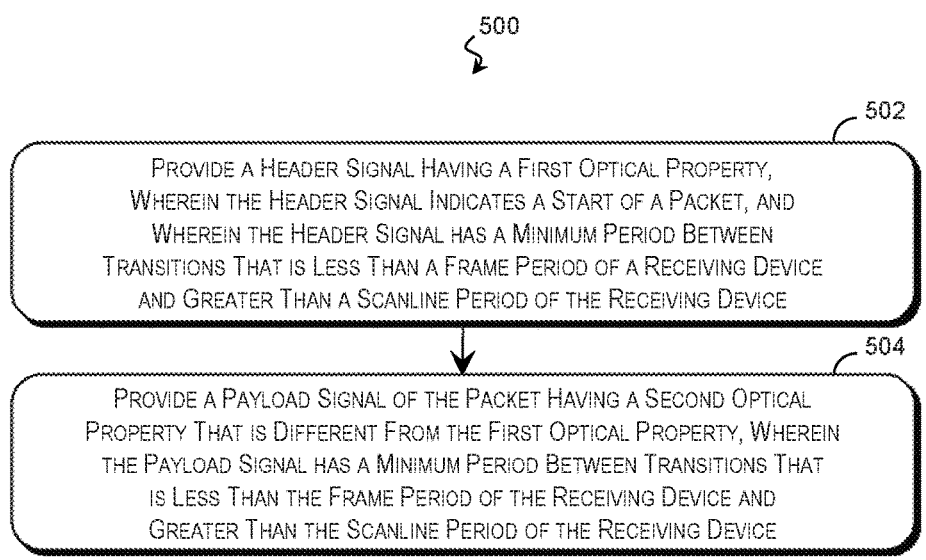
FIG. 5 is a flow diagram of a method of transmitting a data packet according to some examples of the present disclosure.

Further examples of the technique are described with reference to FIG. 5. In that regard, FIG. 5 is a flow diagram of a method 500 of transmitting a data packet according to some examples of the present disclosure. It is understood that the description of method 500 is non-limiting, and steps may be added to and omitted from the method 500 without departing from the disclosure. Furthermore, unless noted otherwise, processes of the method 500 may be performed in any order including being performed concurrently by one or more entities. The method 500 is suitable for performing by the data transmitter 102 of FIG. 1 and/or another transmitting element.

Referring to block 502 of FIG. 5, the data transmitter 102 or other transmitting element provides a header signal 112 having a first optical property. The header signal 112 indicates the start of a packet, and while the signal may have any suitable form or property, aspects of the header signal 112 may be determined based, in part, on a scanline sample rate and/or an image framerate of a receiving device. In some examples, the data receiver 104 captures the header signal 112 using an image sensor 302 with a rolling shutter that assembles frames one scanline at a time. So that the receiver 104 may use the scanlines to sample the individual bits, the minimum period between transitions of the header signal 112 may be greater than the scanline period but less than the frame period of the data receiver 104. In an example, a Manchester-encoded header signal 112 and payload signal 114 have a minimum period between transitions between about 200 μs and about 20 μs. In contrast, a frame period of an image sensor 302 in the example may be on the order of 10 ms with a scanline period of about 10 μs.

Referring to block 504 of FIG. 5, the data transmitter 102 or other transmitting element provides a payload signal 114 having an optical property (such as wavelength or polarity) that is different from that of the header signal 112. As with the header signal 112, aspects of the payload signal 114 may be determined based, in part, on a scanline sample rate and/or an image framerate of a receiving device. For example, the minimum period between transitions of the payload signal 114 may be greater than the scanline period of the data receiver 104 but less than the frame period of the receiver 104.

Figure 6:
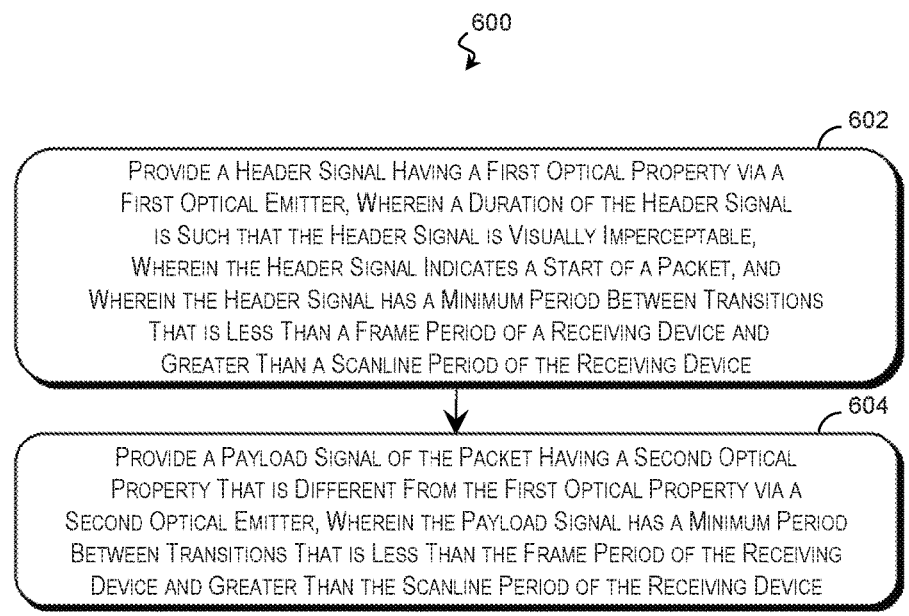
FIG. 6 is a flow diagram of a method of transmitting a data packet according to some examples of the present disclosure.
Figure 7:
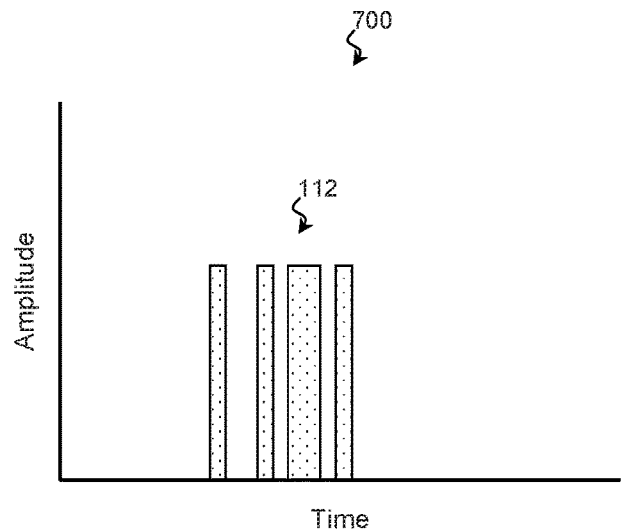
FIG. 7 is a diagram of a header signal over time according to some examples of the present disclosure.
Figure 8:
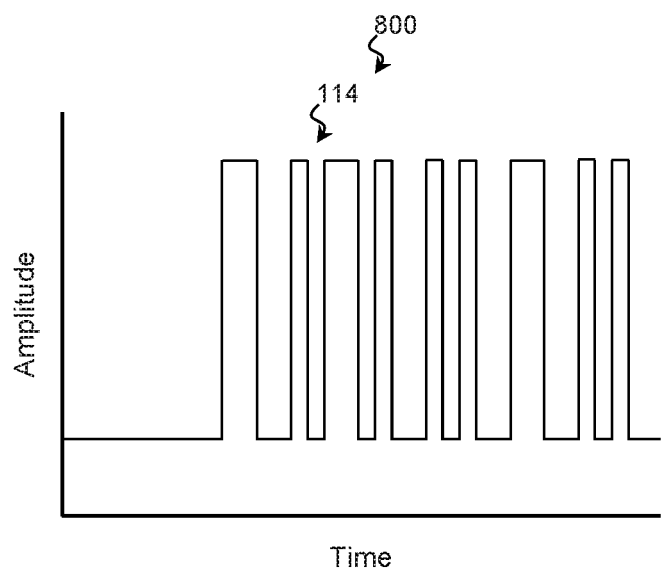
FIG. 8 is a diagram of a payload signal over time according to some examples of the present disclosure.

Further examples of the technique are described with reference to FIGS. 6-8. In that regard, FIG. 6 is a flow diagram of a method 600 of transmitting a data packet according to some examples of the present disclosure. It is understood that the description of method 600 is non-limiting, and steps may be added to and omitted from the method 600 without departing from the disclosure. Furthermore, unless noted otherwise, processes of the method 600 may be performed in any order including being performed concurrently by one or more entities. The method 600 is suitable for performing by the data transmitter 102 of FIG. 1 and/or another transmitting element. FIG. 7 is a diagram 700 of a header signal 112 over time according to some examples of the present disclosure. FIG. 8 is a diagram 800 of a payload signal 114 over time according to some examples of the present disclosure.

Referring to block 602 of FIG. 6 and to FIG. 7, the data transmitter 102 or other transmitting element provides a header signal 112 having a first optical property. The header signal 112 may be provided by an emitter element such as the optical emitter element 110A of FIG. 1 and may include header data encoded in visible light, near-visible light, and/or other suitable electromagnetic radiation. The header signal 112 indicates the start of a packet and may have various data fields encoded in the signal, such as a packet number field 206, a total field 208 that records the total number of packets in a message, and/or an end of message field 210 substantially as described in FIG. 2. Data may be encoded in high and low intensity values of the header signal 112 using amplitude modulation. The duration of the header signal 112 may be selected so that even if the header signal 112 uses a visible portion of the spectrum, the signal is visually imperceptible. In an example, the header is active for between about 10 μs and about 20 μs.

Aspects of the header signal 112 may be determined based, in part, on a scanline sample rate and/or an image framerate of a receiving device. In some examples, the data receiver 104 captures the header signal 112 using an image sensor 302 with a rolling shutter that assembles frames one scanline at a time. So that the receiver 104 may use the scanlines to sample the individual bits, the minimum period between transitions of the header signal 112 may be greater than the scanline period but less than the frame period of the data receiver 104.

Referring to block 602 of FIG. 6 and to FIG. 8, a payload signal 114 having an optical property (such as wavelength or polarity) that is different from that of the header signal 112 is provided. The payload signal 114 may be provided by an emitter element such as optical emitter element 110B of FIG. 1 and may include data corresponding to the payload of a packet encoded in visible light, near-visible light, and/or other suitable electromagnetic radiation. The data may be encoded in high and low intensity values of the payload signal 114 using amplitude modulation.

As with the header signal 112, aspects of the payload signal 114 may be determined based, in part, on a scanline sample rate and/or an image framerate of a receiving device. For example, the minimum period between transitions of the payload signal 114 may be greater than the scanline period of the data receiver 104 but less than the frame period of the receiver 104. In this way, the transitions in the payload signal 114 may be sufficiently brief that individual bits are visually imperceptible and flicker is eliminated.

Figure 9:
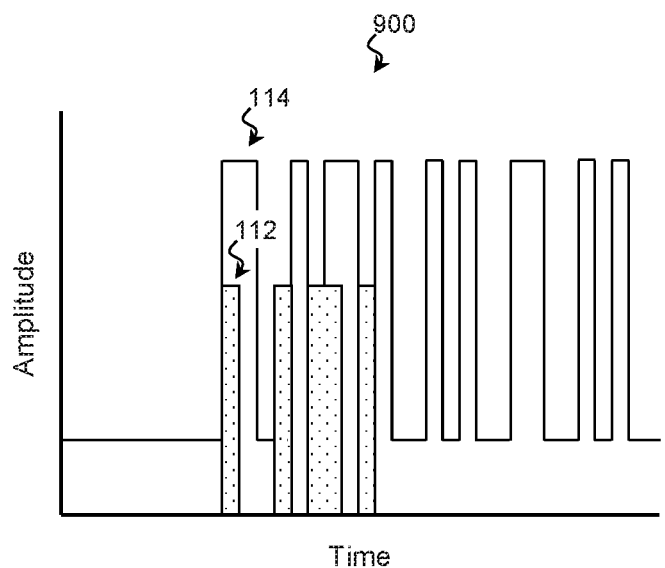
FIG. 9 is a diagram of a header signal and a payload signal over time according to some examples of the present disclosure.
Figure 10:
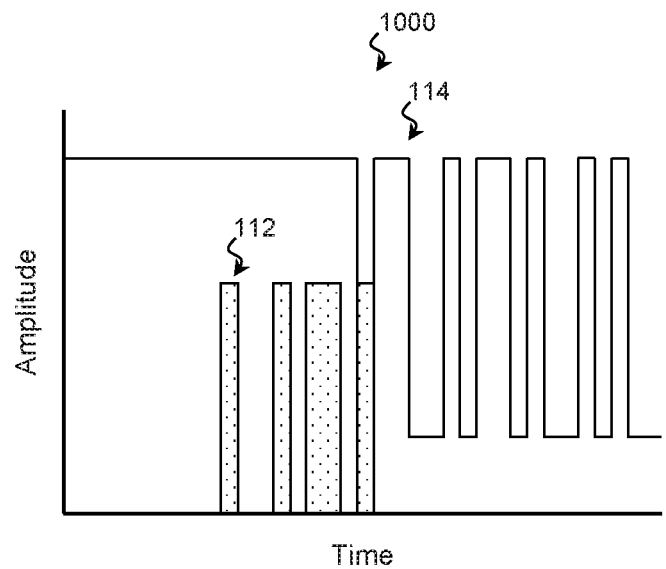
FIG. 10 is a diagram of a header signal and a payload signal over time according to some examples of the present disclosure.
Figure 11:
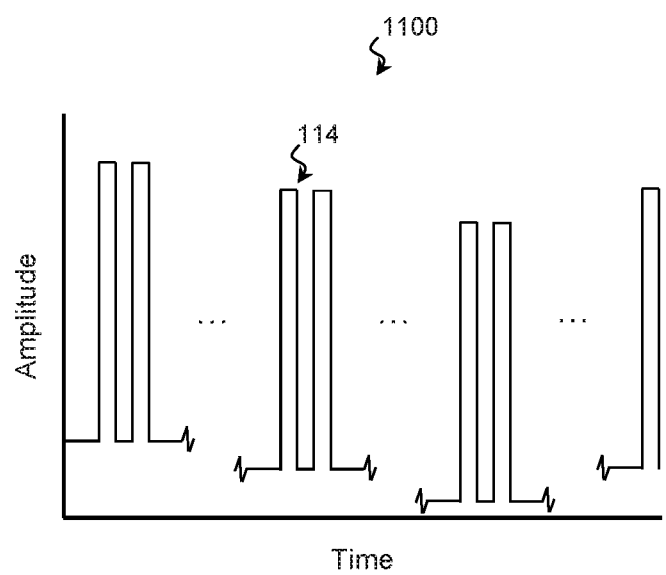
FIG. 11 is a diagram of a payload signal over time according to some examples of the present disclosure.

Further examples of the signals provided by method 500 and/or method 600 are described with reference to FIGS. 9-11. FIG. 9 is a diagram 900 of a header signal 112 and a payload signal 114 over time according to some examples of the present disclosure. FIG. 10 is a diagram 1000 of a header signal 112 and a payload signal 114 over time according to some examples of the present disclosure. FIG. 11 is a diagram 1100 of a payload 114 signal over time according to some examples of the present disclosure.

Referring first to FIG. 9, because the payload signal 114 and the header signal 112 are distinguishable by their different optical properties, in some examples, the payload signal 114 and the header signal 112 for a given packet are transmitted concurrently. In one such example, the header signal 112 and the payload signal 114 begin at the same point in time, although the header signal 112 may complete before the payload signal 114.

Transmitting the two signals concurrently may allow more payload bits to be transmitted in the payload signal 114. As explained above, the data transmitter 102 may have a hard limit on the time allocated to transmit a packet. For example, a maximum packet duration may be selected that is less than half the frame period of the data receiver 104 so that at least one complete packet is received per image frame. If the data transmitter 102 provides the header signal 112 and the payload signal 114 concurrently, the shorter header may allow more time during which the payload signal 114 is active. Accordingly, a longer payload signal 114 containing more data may be transmitted.

The relative intensities of header signal 112 and the payload signal 114 may be different, and in some examples, the high intensity of the payload signal 114 is greater than the high intensity of the header signal 112 to mask the perception of the header signal 112 by the human eye. In some examples, the low intensity of the payload signal 114 are greater than zero (e.g., dimmer than the high intensity, but still observable), as this has been determined to reduce the perception of flicker in the payload signal 114. Accordingly, the user may perceive the light of the payload signal 114 as a consistent light source despite the variations in intensity used to encode the data and despite the occasional header signal 112.

Referring to FIG. 10, a header signal 112 and a payload signal 114 are shown. In the illustrated examples, the header signal 112 precedes the payload signal 114 in time. Because the header signal 112 and the payload signal 114 are distinguishable by their different optical properties, in some examples, the header signal 112 is shorter because it does not use a unique bit sequence or token to differentiate it from the payload signal 114. A shorter header signal 112 may leave more time for a longer payload signal 114. Accordingly, more data may be transmitted. It may also take considerably less processing to identify a header signal 112 based on an optical property rather than a sequence of bits because identifying a sequence may entail a continuous search spanning multiple frames.

In examples where the payload signal 114 does not transmit data during the transmission of the header signal 112, the payload signal 114 may be held in a high-intensity state when idle so that the light from the payload signal 114 masks the light of the header signal 112.

While it may not be desirable to see the flicker of individual bits, the data transmitter 102 may provide some visual indication that data is being transmitted. FIG. 11 is a diagram of a payload signal 114 over time according to some examples of the present disclosure. The payload signal 114 may be substantially similar to that shown in FIGS. 8-10. In the examples of FIG. 11, the data transmitter 102 varies the intensity of the high and/or low intensities in the payload signal 114 during the transmission of block 604 so that the light is perceived to vary. Distinct from behavior perceived as flicker, it has been determined that changes in intensity that occur over a few seconds provide an appealing visual indication that data is being transmitted. In some examples, the peak and/or average intensity of the payload signal 114 is varied with a cycle time of between two and eight seconds to provide a breathing effect that indicates a status such as the transmission of data.

Figure 12:
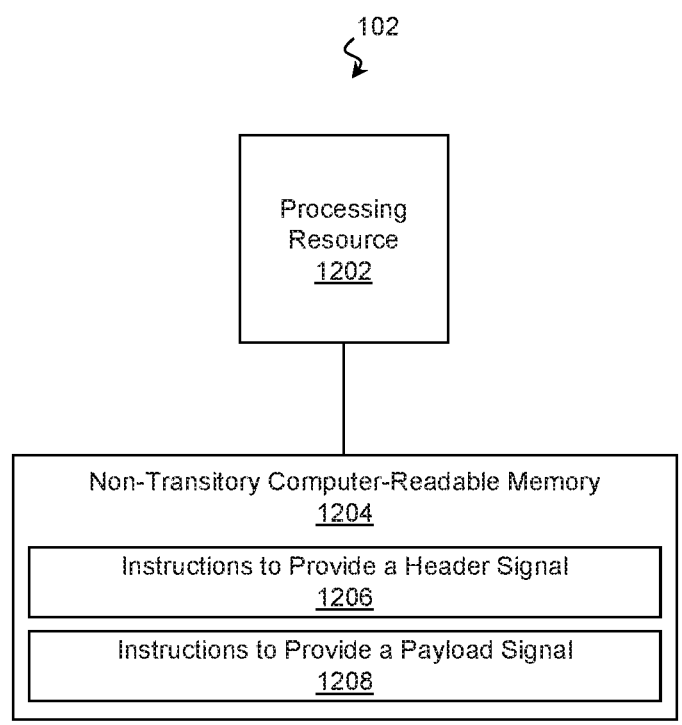
FIG. 12 is a block diagram of a data transmitter including a non-transitory computer-readable memory resource according to some examples of the present disclosure.

The processes of methods 500 and/or 600 may be performed by any combination of hard-coded and programmable logic. In some examples, a processing resource utilizes instructions stored on a non-transitory computer-readable memory resource to perform at least some of these processes. Accordingly, examples of the present disclosure may take the form of a non-transitory computer-readable memory resource storing instructions that perform at least part of method 500 and/or 600. FIG. 12 is a block diagram of a data transmitter 102 including a non-transitory computer-readable memory resource according to some examples of the present disclosure.

The data transmitter 102 may include one or more processing resources 1202 operable to perform any combination of the functions described above. The illustrated processing resource 1202 may include any number and combination of Central Processing Units (CPUs), Graphics Processing Units (GPUs), microcontrollers, Application-Specific Integrated Circuits (ASICs), Field-Programmable Gate Arrays (FPGAs), and/or other processing resources.

To control the processing resource 1202, the data transmitter 102 may include a non-transitory computer-readable memory resource 1204 that is operable to store instructions for execution by the processing resource 1202. The non-transitory computer-readable memory resource 1204 may include any number of non-transitory memory devices including battery-backed RAM, SSDs, HDDs, optical media, and/or other memory devices suitable for storing instructions.

Referring to block 1206, the non-transitory computer-readable memory resource 1204 may store instructions that cause the processing resource 1202 to provide a header signal 112 that indicates a start of a packet. This may be performed substantially as described in block 502 of FIG. 5 and/or block 602 of FIG. 6, and accordingly, the header signal 112 may have a minimum period between transitions that is less than a frame period of a receiving device and greater than a scanline period of a receiving device (e.g., receiver 104). The duration of the header signal 112 may be such that the header signal is visually imperceptible.

Referring to block 1208, the non-transitory computer-readable memory resource 1204 may store instructions that cause the processing resource 1202 to provide a payload signal 114 of the packet. An optical property (e.g., wavelength, polarity, etc.) of the payload signal is different from a corresponding optical property of the header signal. This may be performed substantially as described in block 504 of FIG. 5 and/or block 604 of FIG. 6, and accordingly, the payload signal 114 may have a minimum period between transitions that is less than the frame period and greater than the scanline period of the receiving device.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    optically transmitting, by a transmitting device to a receiving device, a header signal having a first optical property, wherein the header signal indicates a start of a packet, and wherein the header signal has a minimum period between transitions that is less than a frame period of the receiving device and greater than a scanline period of the receiving device; and
    optically transmitting, by the transmitting device to the receiving device, a payload signal of the packet having a second optical property that is different from the first optical property, wherein the payload signal has a minimum period between transitions that is less than the frame period of the receiving device and greater than the scanline period of the receiving device.

2. The method of claim 1, wherein the first optical property includes a first wavelength of the header signal, wherein the second optical property includes a second wavelength of the payload signal, and wherein the first wavelength and the second wavelength are different.

3. The method of claim 2, wherein the second wavelength of the payload signal is within a visible portion of an electromagnetic spectrum.

4. The method of claim 1, wherein the payload signal provides a visual indication of a status.

5. The method of claim 1, wherein a duration of the header signal is such that the header signal is visually imperceptible.

6. The method of claim 1, wherein a data rate of the payload signal is sufficiently high that individual bits are visually imperceptible.

7. The method of claim 1 comprising modifying an amplitude of the payload signal to indicate transmission is occurring.

8. The method of claim 1, wherein the header signal transmits data selected from the group consisting of: a frame number, a count of frames in a message, and an end of message.

9. The method of claim 1, wherein the payload signal transmits data selected from the group consisting of: a system identifier, a part identifier, a uniform resource locator, and an access code.

10. The method of claim 1, wherein the payload signal transmits data selected from the group consisting of: a wireless network configuration parameter, a wireless network key, and a wireless network access credential.

11. The method of claim 1, wherein the header signal is optically transmitted by a first optical emitter element of the transmitting device and the payload signal is optically transmitted by a second optical emitter element of the transmitting device.

12. The method of claim 11, further comprising:
prior to optically transmitting the header signal by the first optical emitter element, instructing, by an encoder of the transmitting device, an emitter driver of the transmitting device to transmit the header signal using the first optical emitter element; and
prior to optically transmitting the payload signal by the second optical emitter element, instructing, by the encoder, the emitter driver to transmit the payload signal using the second optical emitter element.

13. A non-transitory computer-readable memory resource storing instructions that when executed cause at least one processing resource of a transmitting device to:
cause an optical emitter element of the transmitting device to optically transmit, to a receiving device, a header signal that indicates a start of a packet, wherein the header signal has a minimum period between transitions that is less than a frame period of a receiving device and greater than a scanline period of the receiving device, and wherein a duration of the header signal is such that the header signal is visually imperceptible; and
cause the optical emitter element to optically transmit, to the receiving device, a payload signal of the packet, wherein the payload signal has a minimum period between transitions that is less than the frame period and greater than the scanline period, wherein an optical property of the payload signal is different from a corresponding optical property of the header signal.

14. The non-transitory computer-readable memory resource of claim 13, wherein a wavelength of the header signal is different from a wavelength of the payload signal.

15. The non-transitory computer-readable memory resource of claim 13, wherein an amplitude of the header signal is less than an amplitude of the payload signal.

16. The non-transitory computer-readable memory resource of claim 13, wherein the at least one processing resource is to cause the optical emitter element to optically transmit the header signal by causing a first optical emitter element to optically transmit the header signal,
and wherein the at least one processing resource is to cause the optical emitter element to optically transmit the payload signal by causing a second optical emitter element to optically transmit the payload signal.

17. The non-transitory computer-readable memory resource of claim 16, wherein the at least one processing resource is to cause the optical emitter element to optically transmit the header signal by instructing an emitter driver of the transmitting device to optically transmit the header signal using a first optical emitter element,
and wherein the at least one processing resource is to cause the optical emitter element to optically transmit the payload signal by instructing the emitter driver to optically transmit the payload signal using a second optical emitter element.

18. The non-transitory computer-readable memory resource of claim 17, wherein the at least one processing resource comprises an encoder of the transmitting device.

19. A system comprising:
an emitter driver communicatively coupled to a first optical emitter element and a second optical emitter element; and
an encoder communicatively coupled to the emitter driver to:
instruct the emitter driver to transmit a header signal via the first optical emitter element such that the header signal has a minimum period between transitions that is less than a frame period of a data receiver and greater than a scanline period of the data receiver; and
instruct the emitter driver to transmit a payload signal of the frame via the second optical emitter element such that the payload signal has a minimum period between transitions that is less than the frame period of the data receiver and greater than the scanline period of the data receiver and such that an optical property of the header signal is different from a corresponding optical property of the payload signal.

20. The system of claim 19, wherein a duration of the header signal is such that the header signal is visually imperceptible.

* * * * *